United States Patent Office 2,882,741
Patented Apr. 21, 1959

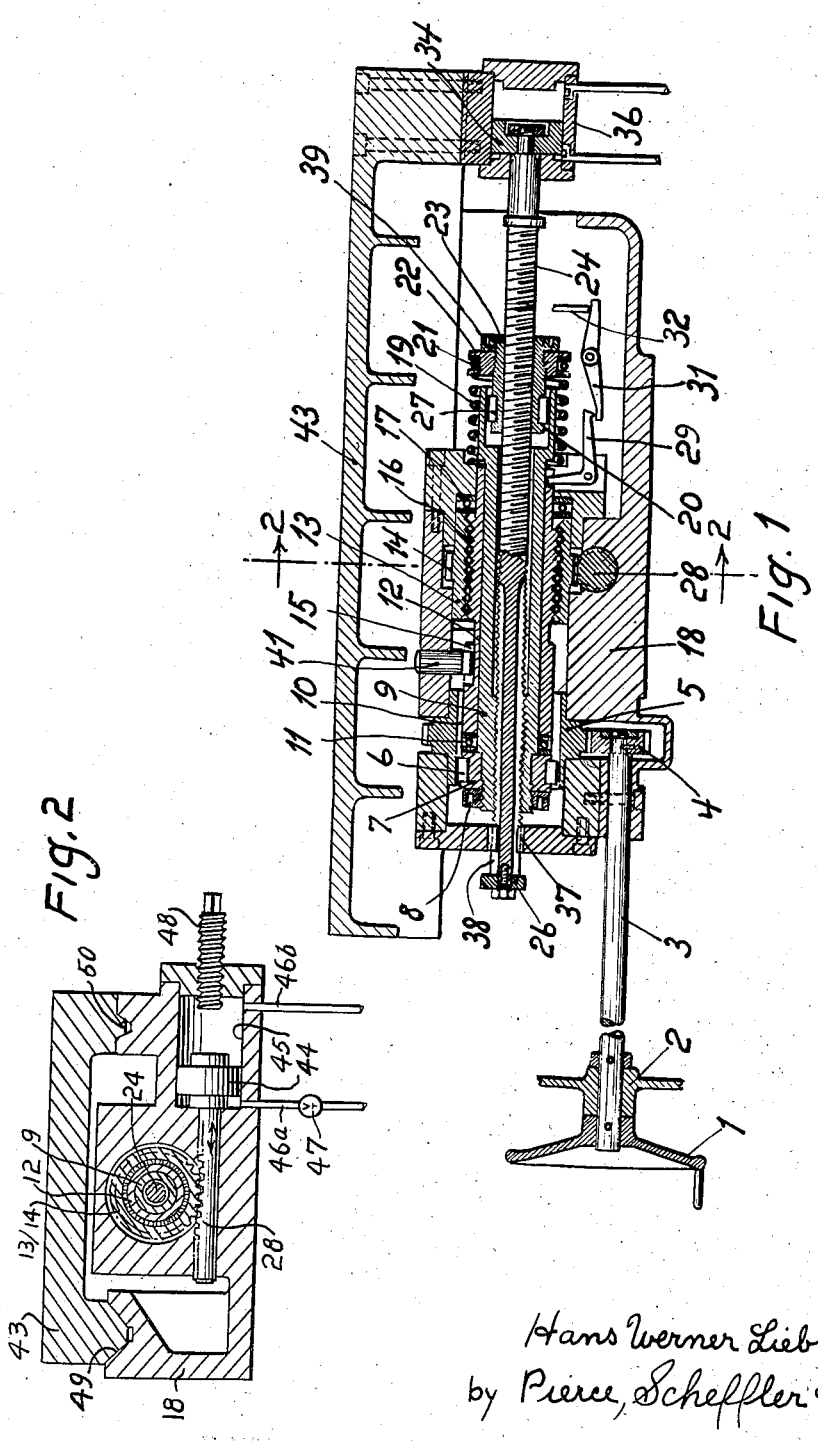

2,882,741

SLIDING SUPPORT WITH TWO FEEDING MECHANISMS INDEPENDENT OF EACH OTHER

Hans Werner Liebmann, Karlskoga, Sweden, assignor to Aktiebolaget Johanssons Press- & Hejarverktyg, Bofors, Sweden, a company of Sweden Application October 17, 1955, Serial No. 540,843

Claims priority, application Sweden October 22, 1954

7 Claims. (Cl. 74—424.8)

The present invention relates to a sliding support with two feeding or operating mechanisms independent of each other. The sliding support in accordance with the invention is characterized by the feature that it comprises an externally threaded feed shaft movable in axial direction; an internally threaded turnable sleeve coupling engaging the feed shaft; a first feeding device adapted to turn said coupling; a feeding sleeve, turnable in relationship to the coupling, being under firm axial contact with the latter and adapted to move the coupling in axial direction; and a second feeding device, adapted to move the feeding sleeve in axial direction.

The invention will be described more in detail hereinafter and reference will be made to the accompanying drawings.

Fig. 1 is a view in vertical longitudinal section through one embodiment of the invention, and Fig. 2 is a view in vertical transverse section taken on line 2—2 of Fig. 1.

The sliding support in accordance with the drawing, comprises a table 43, adapted to be moved forward and backward on a base 18, the table 43 being slidably mounted on the base by means of ways 49 and 50 at opposite sides thereof as shown in Fig. 2. Movement of table 18 is governed by means of a feed shaft 24 and a feeding mechanism therefor, situated in a housing portion 18a located within base 18. The first feeding mechanism comprises a hand wheel 1, which by means of a shaft 3, journalled in a bearing 2, drives a pinion gear 4, which in turn meshes with an annular gear 42 formed on the outer part of a bushing 5. This bushing is provided on the inside with axial slots 10, engaged by keys 6 seated on a bushing 7. The latter is mounted on the end of an internally threaded coupling 9 and locked to the same by a nut 8. When bushing 5 is rotated, it thus turns bushing 7 and coupling 9 also, while on the other hand the two latter members are free to slide in axial direction in respect to bushing 5. Coupling 9 is screwed on to feed shaft 24, which has threads along the major part of its length and for a certain part of its length is provided with slots 38. These slots are engaged by keys 37, seated in a guiding hole of housing 18a. Thus shaft 24 cannot be rotated, but can slide axially in relation to housing 18a. One end of the feed shaft is provided with a circular stop plate 26, and the other end is provided with a piston 34 reciprocating in a hydraulic cylinder 36, which is arranged on table 43 and serves for high speed operation of the sliding support.

The second feeding device, which is intended for automatic feeding, comprises a gear rack or shaft 28 meshing with an external gear ring 14 of nut 13. Gear rack 28 is secured to and actuated by a piston 44 in a hydraulic cylinder 45. See Fig. 2. Oil is supplied to and removed from cylinder 45 through conduits 46a, 46b. The supply of oil can be regulated by valve 47 in conduit 46a. The permissible stroke of piston 44 can be adjusted by means of a screw type stop 48 threaded axially into cylinder 45 through an end wall thereof.

Nut 13 cooperates, by means of a ball thread 16, with a sleeve 12 which surrounds coupling 9. Sleeve 12 is provided with slots 15, engaged by keys on guiding stubs 41. Thus sleeve 12 does not revolve but can move in axial direction in relationship to coupling 9 when nut 13 is rotated. One end of sleeve 12 is in contact with bushing 7, mounted on coupling 9, through a thrust ball bearing 11. Nut 13 contacts housing 18 by a thrust ball bearing 17. When feed shaft 24 is forced to the right on the drawing, the thrust will thus be absorbed by the inner wall of housing 18a and transmitted by coupling 9, bushing 7, bearing 11, sleeve 12, nut 13 and bearing 17.

An internally threaded bushing 23 is also screwed on to threaded feed shaft 24. This bushing is provided with keys 27, engaging slots 20, which are situated axially in an enlarged section of the hole going through coupling 9. Thus, by turning coupling 9 bushing 23 will also revolve; the latter on the other hand being able to move freely in axial direction in relation to coupling 9. Fastened to bushing 23, by means of a nut 39, is an outer bushing 22, carrying a thrust bearing 21. A helical spring 19 is so arranged that one end is in contact with housing 18a and the other with bearing 21. Hence this spring 19 will push bushing 23 and thereby also feed shaft 24 to the right on the drawing and, in accordance with the aforesaid, the thrust exerted on the feed shaft by the helical spring will be absorbed by the inner wall of housing 18a. The play existing between the moving members of the system will thereby be removed so that the feeding movement of the sliding support will take place with no play either in left or right direction.

The sliding support according to the drawing will thus operate in the following manner. For hand feeding, coupling 9 is rotated by means of hand wheel 1, shaft 3, pinion gear 4 and bushing 5. In this course of events non-revolving feed shaft 24 will be displaced in axial direction. The axial position of coupling 9 and bushing 23 in relationship to housing 18a will not be changed during this feeding operation. For automatic feeding, nut 13 is rotated by gear rack or shaft 28. Thereby non-revolving sleeve 12 will move axially and by thrust ball bearing 11 displace bushing 7 and in so doing also move coupling 9 and feed shaft 24 in axial direction. Hence, by this feeding operation helical spring 19 will be compressed.

As shown, the two feeding mechanisms operate completely independent of each other. Hence, they can be used simultaneously, whereby the resulting feed will be the sum of the feed which would have been obtained by each feeding device by itself.

To control the hand feeding, wheel 1 can be suitably provided with a scale, not shown. To control the automatic feeding, the sliding support in accordance with the drawing is provided with a mechanism consisting of two links 29 and 31, and a bar 32 which is coupled to and actuates a dial indicator, not shown. Because of the weight of bar 32, one end of link 29 makes contact with coupling 9 which by automatic feeding will move axially. The movement of the sliding support can thereby be observed on the dial indicator.

What is claimed is:

1. A sliding support comprising an externally threaded feed shaft arranged for movement in an axial direction, an internally threaded axially displaceable and rotatable inner coupling surrounding said feed shaft and threadedly engaged with the external threads on said feed shaft, a first feeding device operatively connected to said inner coupling for rotating the same while in an axially non-displaced condition thereby to effect an axial displacement of said feed shaft, an outer sleeve surrounding said inner coupling, said outer sleeve being non-rotatable but axially slidable and being connected to said inner coupling for conjoint axial movement, and a second feeding device operatively connected to said outer sleeve for effecting axial displacement thereof and hence also axial displacement of said inner coupling and feed shaft.

2. A sliding support as defined in claim 1 wherein said first feeding device comprises a rotatable non-axially displaceable bushing provided with an external gear meshed with a driving gear, said bushing surrounding said inner coupling and being operatively connected thereto by means effecting rotation of said inner coupling when said bushing is rotated and permitting axial displacement of said inner coupling and means for rotating said driving gear.

3. A sliding support as defined in claim 1 wherein said second feeding device comprises a rotatable non-axially displaceable nut provided with an external gear ring by which said nut is driven in rotation, said nut having the internal threads thereof engaged with an externally threaded portion on said outer sleeve and driving means engageable with said external gear ring for rotating said nut and hence effecting axial displacement of said outer sleeve.

4. A sliding support as defined in claim 3 and which further includes a thrust bearing arranged between said rotatable nut and a housing surrounding said outer sleeve and components of said first and second feeding devices.

5. A sliding support as defined in claim 1 and which further includes a spring means effecting a resilient load on said feed shaft in a direction opposite to that in which said feed shaft is displaced.

6. A sliding support as defined in claim 1 and which further includes an internally threaded bushing arranged on said feed shaft and operatively connected to said inner coupling for rotation by the latter, said bushing being axially slidable with respect to said inner coupling, and spring means surrounding said coupling and exerting axial pressure against said bushing in a direction opposite to the feeding direction of said feed shaft.

7. A sliding support as defined in claim 1 and which further includes a thrust bearing arranged at the axial connection between said outer sleeve and said inner coupling.

References Cited in the file of this patent

UNITED STATES PATENTS 2,630,022     Terdina _____ Mar. 3, 1953